United States Patent

Schupan

[15] 3,685,366
[45] Aug. 22, 1972

[54] RACING CENTRIFUGAL CLUTCH ASSEMBLY

[72] Inventor: Fred A. Schupan, York, Pa.
[73] Assignee: AMF Incorporated
[22] Filed: Aug. 26, 1970
[21] Appl. No.: 67,147

[52] U.S. Cl. .........................................74/230.17 E
[51] Int. Cl. ..............................................F16h 55/52
[58] Field of Search ............................74/230.17 E

[56] References Cited

UNITED STATES PATENTS

| | | |
|---|---|---|
| 3,266,330 | 8/1966 | Galleher............74/230.17 E |
| 2,556,512 | 6/1951 | Ammon..............74/230.17 E |
| 3,017,783 | 1/1962 | Van Der Brugghen..........74/230.17 E |
| 3,230,787 | 1/1966 | Siegal..............74/230.17 CC |
| 3,574,366 | 4/1971 | Thostenson.........74/230.17 E |

*Primary Examiner*—C. J. Husar
*Attorney*—George W. Price and Barry H. Fishkin

[57] ABSTRACT

In a centrifugal clutch including a drive shaft, a pair of pulley flanges mounted on said drive shaft and providing therebetween a groove for a V-belt, one of the pulley flanges being axially movable on the drive shaft to vary the radial position of the V-belt with respect to the pulley flanges, apparatus for axially moving said movable pulley flange in response to the angular velocity of the drive shaft, comprising a cam ramp fixedly mounted to said drive shaft in spaced relationship with the side of the movable pulley flange, said cam ramp including a portion curved toward said movable pulley flange, a centrifugal weight mounted for radial movement with respect to said movable pulley flange and said cam ramp, and means for inhibiting the radial movement of said centrifugal weight until a predetermined drive shaft angular velocity is reached.

7 Claims, 6 Drawing Figures

PATENTED AUG 22 1972 3,685,366

INVENTOR
FRED A. SCHUPAN
BY
ATTORNEY

//3,685,366//

RACING CENTRIFUGAL CLUTCH ASSEMBLY

BACKGROUND

This invention relates to variable speed V-belt transmissions by which power is transmitted from a driving shaft to a driven shaft and more particularly to an improved centrifugal clutch for such variable speed transmissions. Transmissions of this type are commonly utilized in small vehicles, such as snowmobiles, golf carts, motorcycles and the like.

In transmissions of this type each of the shafts commonly carries a pulley including a pair of opposed pulley flanges which between them provide a V-shaped groove adapted to receive a belt connecting the two pulleys. The V-belt is normally mounted at the bottom of the pulley on the driving shaft and the top of the pulley on the driven shaft. One flange of each of the pulleys is movable against a bias. The pulley on the driving shaft is operatively connected to means having centrifugal weights for shifting the movable pulley flange in response to engine speeds and is called a centrifugal clutch. With increasing drive shaft speed the centrifugal clutch will close the space between the pulley flanges and urge the V-belt outwardly. This will pull the belt inwardly in the pulley on the driving shaft thus moving the transmission from a high torque to a high speed mode.

In applications where this type of transmission is utilized, particularly snowmobiles, the sensitivity of the drive with respect to the throttle is of the utmost importance. The operator of the vehicle should have a sensitive control wherein the speed of the vehicle can be smoothly accelerated and decelerated to provide the needed control of the vehicle for the uneven terrain that these vehicles often are driven across. In the past such vehicle speed control has been lacking due to a predilection for the centrifugal weights in the clutch to stick and be responsive only to large increase in engine speed, causing lurching and lunging of the vehicle.

In racing applications it is desireable to have a lunge at the start of the race to get the vehicle quickly up to maximum speed. In this situation, it is desireable to have the centrifugal weights in the clutch maintained in a non-driving position until the engine speed has been increased to a predetermined point, whereupon the weights lurch outwardly, accelerating the vehicle at a rapid rate.

SUMMARY

It is, therefore, an object of this invention to provide an improved variable speed drive for small vehicles.

It is a further object of this invention to provide a centrifugal clutch for a variable speed transmission having increased responsiveness to engine speed.

It is a further object of this invention to provide an improved variable speed drive adaptable for racing applications.

It is a still further object of this invention to provide a centrifugal clutch having improved centrifugal weight assemblies and also adaptable for high engine speed engagement for racing applications.

In accordance with these and other objects, apparatus according to the invention may comprise in combination with a drive shaft, a pair of pulley flanges mounted on said drive shaft and providing therebetween a groove for a V-belt, one of the pulley flanges being axially movable on the drive shaft to vary the radial position of the V-belt with respect to the pulley flanges, means for axially moving said pulley flanges in response to the angular velocity of the drive shaft, including: a cam ramp fixedly mounted to said drive shaft in spaced relationship with the side of the movable pulley flange away from the other pulley flange, said cam ramp including a portion curved toward said movable pulley flange, a weight mounted for rolling movement between said cam ramp and said movable pulley flange and means for precluding the rolling of said weights until the drive shaft is rotating at a predetermined angular velocity.

DESCRIPTION OF THE PREFERRED EMBODIMENT

Figure 1:
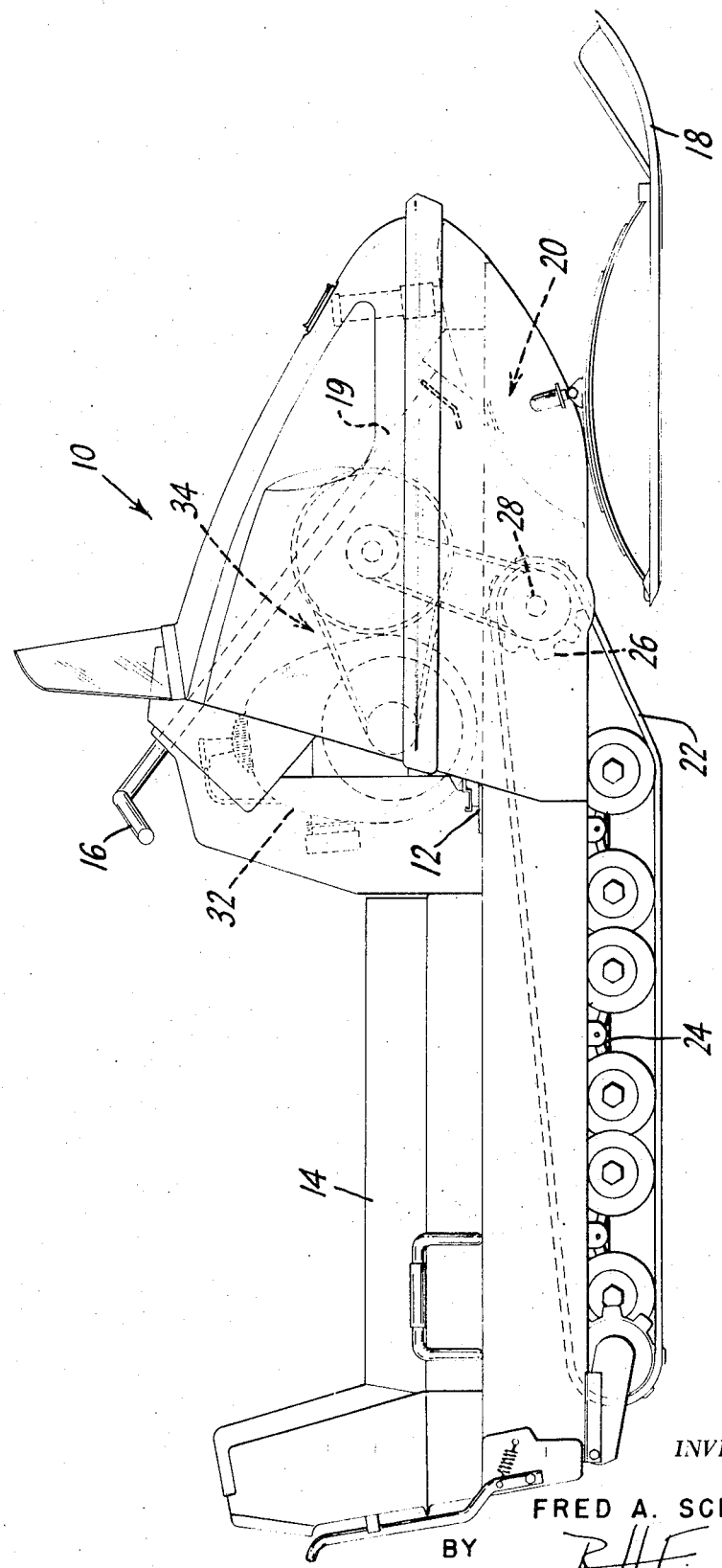
FIG. 1 is a side view of a snowmobile incorporating the invention.

With reference to the drawings, a preferred embodiment of the invention is shown in connection with a snowmobile, but it is to be understood that it could be utilized in other vehicle applications.

In general, a snowmobile 10 includes a frame 12, a seat 14 for the operator and a steering handle 16 for manipulating a pair of steering skis 18 through a shaft 19 and a linkage 20. A traction belt 22 is mounted over a suspension 24 which is mounted in turn to the frame 12. The traction belt is driven by a pair of drive sprockets 26 mounted on a shaft 28 and each engageable with a rectilinear succession of sprocket holes 30 in the traction belt. The sprocket drive shaft 28 is driven by a motor 32 through a variable speed drive, generally designated 34.

The variable speed drive 34 includes a drive shaft 36 extending from and rotated by motor 32. First and second pulley flanges, 38 and 40 respectively, are mounted on drive shaft 36 for rotation along therewith and provide therebetween a groove 42 for engaging and driving a V-belt 44. First pulley flange 38 is fixed on shaft 36 against axial movement. The second pulley flange 40 is axially shiftable to vary the size of groove 42 and thus the radial position of V-belt 44 with respect to the pulley flanges. The pulley flanges 38 and 40 are mounted on shaft 36 so that at engine idling speed there is a gap between the V-belt and the pulley flanges and the V-belt is not driven thereby.

A driven shaft 46 is mounted in parallel spaced relationship with drive shaft 36. A pair of opposed pulley flanges, 48 and 50 respectively, are mounted on the driven shaft 46 and form a groove 52 therebetween in spaced relationship with groove 42 for receiving V-belt 44 such that shaft 46 can be driven from shaft 36 by the V-belt 44. The sprocket wheel drive shaft 28 is driven from shaft 46 through a sprocket 54 mounted thereon, a sprocket (not shown) mounted in spaced relationship therewith on the sprocket wheel drive shaft 28 and a chain 56 mounted over both sprockets.

Pulley flange 50 is axially movable on driven shaft 46 against a spring bias (not shown) mounted in a housing 58. The normal position of the pulley flanges 48 and 50, that at engine idling speed, is such that the V-belt is at its radially outward position.

Figure 3:
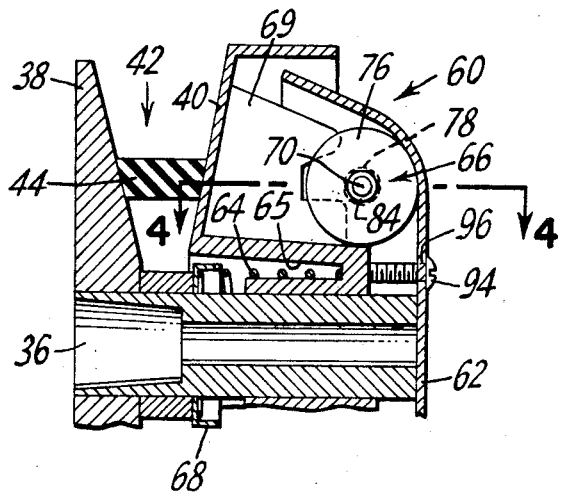
FIG. 3 is a side elevation view of a centrifugal clutch according to the invention in a first mode.

With reference to FIG. 3, a centrifugal clutch 60 is mounted on shaft 36 for axially shifting pulley flange 40 in response to variations in the angular velocity of the drive shaft. The centrifugal clutch includes a cam ramp 62 affixed to the shaft, spring means 64 mounted in a recess 65 in the pulley flange 40 to bias the latter away from pulley flange 38, and a plurality of centrifugal weights 66 mounted for rolling movement between said cam ramp and said movable pulley flange. A member 68 retains the spring 64 in the recess 65.

A plurality of guide flanges 69 are provided on pulley flange 40 and extend toward cam ramp 62. These flanges serve to maintain the centrifugal weights rolling in a radial direction.

Figure 4:
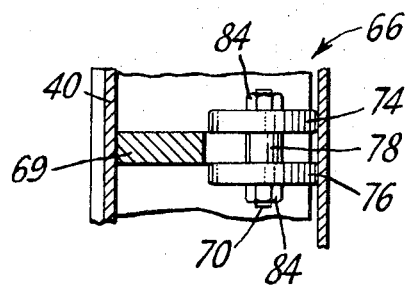
FIG. 4 is a sectional view of a portion of the clutch shown in FIG. 3 taken along line 4—4 of FIG. 3.

With reference to FIG. 4, each of the centrifugal weights 66 includes a threaded rod 70, first and second wheels 74 and 76 mounted on said rod and separated by a member 78 that is bearingly mounted on the rod 70. Nuts 82 and 84 mounted on the rod outside of wheels 74 and 76 secure the wheels and the member 78 in place on the rod 70.

The centrifugal weights are guided in a radial direction by positioning them with the wheels 74 and 76 on either side of the flanges 69 formed on the pulley flange 40. With this arrangement, the bearing member 78 abuts flange 69 and rolls therealong to reduce friction therebetween while the periphery of the wheels 74 and 76 roll along the surface of cam ramp 62.

Figure 5:
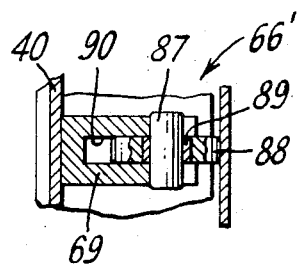
FIG. 5 is a sectional view of a portion of the clutch shown in FIG. 3 taken along line 4—4 of FIG. 3, showing an alternate embodiment of the clutch centrifugal weight arrangement.

With reference to FIG. 5 an alternate embodiment of a centrifugal weight 66' is shown and includes a rod 87 having a single wheel 88 mounted thereon, a bearing 89 mounts the wheel for free rotational movement on rod 87 and the rod for rotational movement with respect to the wheel. The centrifugal weight 66' is mounted with the periphery of wheel 88 rolling on the cam ramp and the bearing 89 rolling on the pulley flange. A recess 90 is provided in the pulley flange to free the periphery of the wheel from all contact except with the cam ramp.

In operation, with the clutch as described hereinabove, as the operator of the vehicle depresses the motor throttle control to initiate movement of the vehicle, the motor RPMs increases thereby increasing the angular velocity of the drive shaft. This causes the centrifugal weights 66 or 66' to roll radially outwardly, forcing the pulley flange 40 toward pulley flange 38 against the spring bias between pulley flange 40 and cam ramp 62. Initially, this causes the V-belt to be engaged by both pulley flanges and to be driven thereby.

Figure 2:
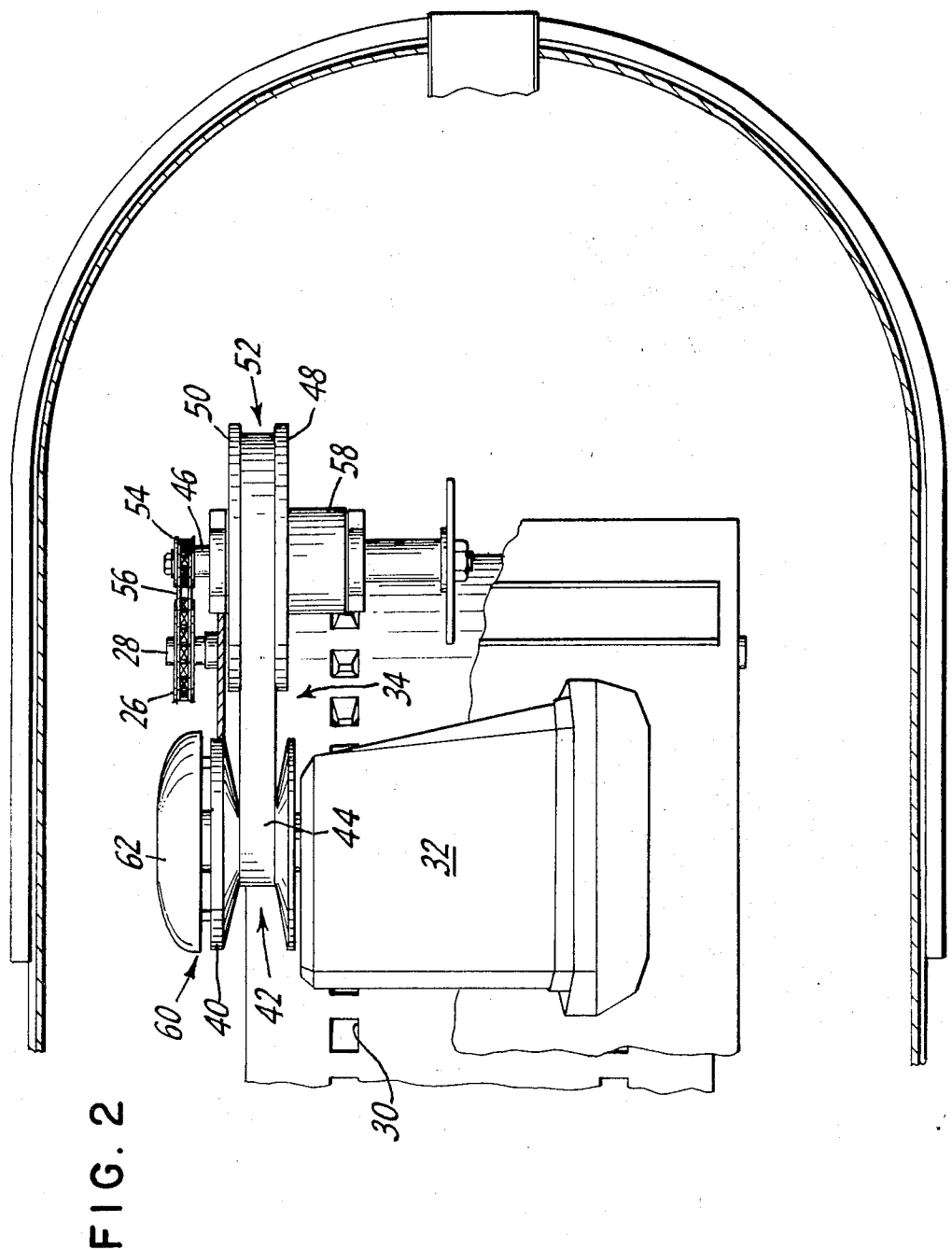
FIG. 2 is a partial plan view of the snowmobile shown in FIG. 1.

With continued increasing motor speed and drive shaft angular velocity, the centrifugal weights continue to roll radially outwardly and the cam ramp progressively forces pulley flange 40 toward pulley flange 38 and the V-belt 44 moves radially outwardly in groove 42. This exerts a radially inward pull on the V-belt portion between pulley flanges 48 and 50 and the pulley flange 50 is displaced to the right as seen in FIG. 2 against the spring means in housing 58 to accommodate the inward movement of the V-belt.

In this way, as the operator of the snowmobile increases his throttle pressure, the vehicle will go from a stationary idle to a high torque, low speed acceleration to a high speed, low torque cruise speed. The bearingly mounted idler-type centrifugal weights enable changes in vehicle speed to be made smoothly and with precision.

Figure 6:
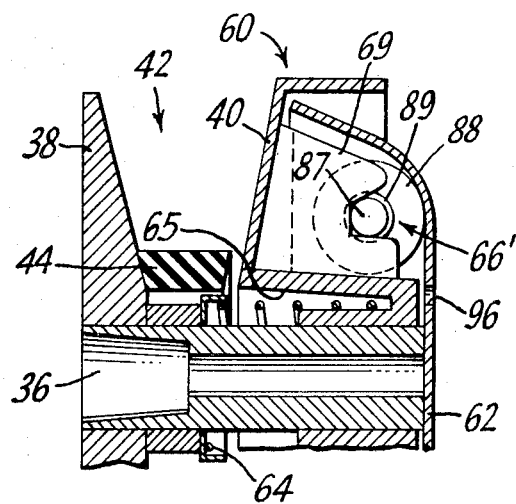
FIG. 6 is a side elevation view of a centrifugal clutch according to the invention in a second mode.

For racing applications, a notch 92 is provided adjacent the inner end of each of the flanges 69. The notch is sized and located such that when the motor is in its idle mode the spring 64 will urge the flange 69 to a position where the notch will receive therein the bearing member 78 of the centrifugal weights of FIG. 4 or the rod 87 of the centrifugal weights of FIG. 5. Thus, when engine RPMs are increased, instead of the centrifugal weights rolling between the flanges 69 and the cam ramp 62 to gently engage and move the V-belt 44 outwardly as described hereinabove, the spring and notch will retain the centrifugal weights in place until the angular velocity of the shaft is increased to a point predetermined by the strength of spring 64 and the slope of the notch radially outer surface of the notch 92, whereupon the lateral component of the centrifugal force of the centrifugal weights will overcome the retaining impulse of the notch and spring and the weights will lurch outwardly along the cam ramp and the upper part of flange 89, forcing the pulley flange 40 suddenly and substantially to the left as seen in FIGS. 3 and 6, engaging the V-belt 44 and forcing it outwardly in groove 42.

Thus, the snowmobile will be suddenly driven forward from a stop through a high acceleration to a high speed mode, which is highly desireable at the start of a race.

To utilize the same clutch for recreational driving, the notch 92 can be by-passed by emplacing a screw 94 in a hole 96 in the cam ramp 62. The screw prevents the spring 64 from urging the pulley flange 40 sufficiently to the right to allow the notch to receive the bearings 78 or rods 87, as seen in FIG. 3. With the screw in position, then, the clutch will operate as if the notches 92 were not there.

The clutch engagement speed can be made adjustable by making the screw position adjustable and curving the radially outward surface of the notch 92. With this arrangement, the sensitivity of the clutch to particular engine speeds can be adjusted by manipulation of the screw.

Having now fully set forth both structure and operation of preferred embodiments of the concept underlying the present invention, it may be that various other embodiments as well as certain variations and modifications of the embodiments herein shown and described will occur to those skilled in the art upon becoming familiar with said underlying concept. All such embodiments, variations, and modifications as incorporate the spirit of the invention and depend upon its underlying concept are consequently to be considered as within the scope of the claims appended herebelow, unless the claims by their language expressly state otherwise.

I claim:

1. In a centrifugal clutch having a drive shaft and a pulley flange mounted for slidable movement on said drive shaft to engage said clutch, apparatus for sliding said pulley flange, comprising:
   a cam ramp in spaced relationship with said slidable pulley flange,
   a centrifugal weight mounted for radial movement between said pulley flange and said cam ramp, and
   means for retaining the centrifugal weight against radial movement below a predetermined drive shaft angular velocity, and
   further comprising means selectively attachable to said clutch for by-passing said centrifugal weight retaining means.

2. In a centrifugal clutch having a drive shaft and a pulley flange mounted for slidable movement on said drive shaft to engage said clutch, apparatus for sliding said pulley flange, comprising:
   a cam ramp in spaced relationship with said slidable pulley flange,
   a centrifugal weight mounted for radial movement between said pulley flange and said cam ramp, and
   means for retaining the centrifugal weight against radial movement below a predetermined drive shaft angular velocity, and
   wherein: said means for retaining the centrifugal weight against radial movement includes a recess formed in said slidable pulley flange and adapted to receive a portion of said centrifugal weight therein and means biasing said slidable pulley flange toward said centrifugal weight, and
   further comprising means selectively attachable to said clutch for by-passing said recess in the slidable pulley flange by precluding the engagement of said notch with said centrifugal weight.

3. Apparatus according to claim 2, wherein said selective by-passing means is adjustable for providing selectable slidable movement of the pulley flange with respect to the cam ramp to vary the speed at which clutch engagement occurs.

4. In a centrifugal clutch including a drive shaft, a pair of pulley flanges mounted on said drive shaft and providing therebetween a groove for a V-belt, one of the pulley flanges being axially movable on the drive shaft to vary the radial position of the V-belt with respect to the pulley flanges, apparatus for axially moving said movable pulley flange in response to the angular velocity of the drive shaft, comprising:
   a cam ramp fixedly mounted to said drive shaft in spaced relationship with the side of the movable pulley flange away from the other pulley flange, said cam ramp including a portion curved toward said movable pulley flange,
   a centrifugal weight mounted for radial movement with respect to said movable pulley flange and said cam ramp, and
   means for inhibiting the radial movement of said centrifugal weight until a predetermined drive shaft angular velocity is reached, and
   wherein said centrifugal weight includes:
   a rod,
   a pair of wheels mounted on said rod for rolling engagement with said cam ramp, and
   a bearing of smaller diameter than the wheels on said rod between said wheels for rolling engagement with said pulley flange, and
   wherein said pulley flange includes a guideway extending toward the cam ramp outwardly therealong, and
   said wheels are mounted on the rod in positions spaced laterally away from the sides of the guideway such that the wheels are guided thereby.

5. In a centrifugal clutch including a drive shaft, a pair of pulley flanges mounted on said drive shaft and providing therebetween a groove for a V-belt, one of the pulley flanges being axially movable on the drive shaft to vary the radial position of the V-belt with respect to the pulley flanes, apparatus for axially moving said movable pulley flange in response to the angular velocity of the drive shaft, comprising:
   a cam ramp fixedly mounted to said drive shaft in spaced relationship with the side of the movable pulley flange away from the other pulley flange, said cam ramp including a portion curved toward said movable pulley flange,
   a centrifugal weight mounted for radial movement with respect to said movable pulley flange and said cam ramp, and
   means for inhibiting the radial movement of said centrifugal weight until a predetermined drive shaft angular velocity is reached, and
   wherein said centrifugal weight includes:
   a rod,
   a pair of wheels mounted on said rod for rolling engagement with said cam ramp, and
   a bearing of smaller diameter than the wheels on said rod between said wheels for rolling engagement with said pulley flange, and
   wherein a pair of guide members are mounted on the cam ramp, spaced apart a distance sufficient to receive both wheels therebetween.

6. Apparatus according to claim 4, wherein a plurality of guideways are mounted on said pulley flange equidistantly therearound, a rolling weight is mounted on each guideway and a pair of guide members are mounted on the cam ramp to receive both wheels of each rolling weight therebetween.

7. In a centrifugal clutch including a drive shaft, a pair of pulley flanges mounted on said drive shaft and providing therebetween a groove for a V-belt, one of the pulley flanges being axially movable on the drive shaft to vary the radial position of the V-belt with respect to the pulley flanges, apparatus for axially moving said movable pulley flange in response to the angular velocity of the drive shaft, comprising:
   a cam ramp fixedly mounted to said drive shaft in spaced relationship with the side of the movable pulley flange away from the other pulley flange, said cam ramp including a portion curved toward said movable pulley flange,
   a centrifugal weight mounted for radial movement with respect to said movable pulley flange and said cam ramp, and
   means for inhibiting the radial movement of said centrifugal weight until a predetermined drive shaft angular velocity is reached, and
   wherein said centrifugal weight includes:
   a rod,
   a wheel bearingly mounted on said rod for rotation with respect thereto and rolling engagement with said cam ramp, a guideway mounted on said pulley flange and extending therefrom towards said cam ramp, said guideway having a recess therein to accept a portion of said wheel therein, and the bearing of said roller weight being mounted for rolling engagement with said guideway on both sides of said recess.

* * * * *